M. AMS.
METHOD OF PRODUCING FRUIT BUTTER.
No. 184,027.                                Patented Nov. 7, 1876.
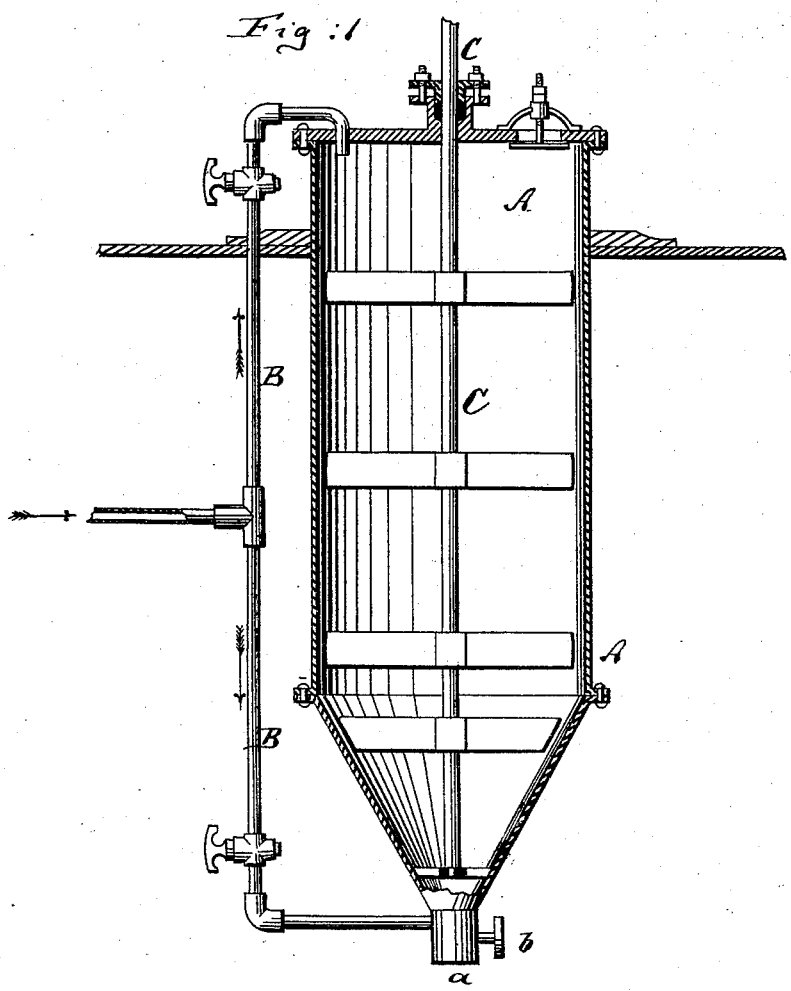
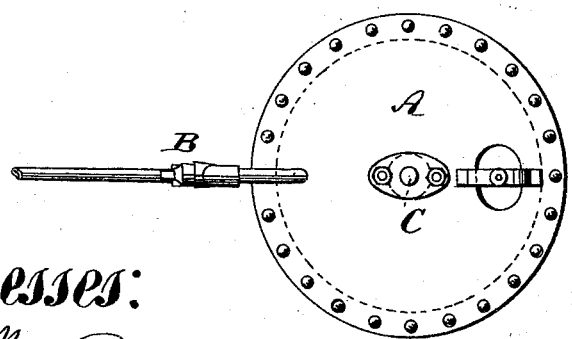
Witnesses:
A. Moraga
D. Briesen
Inventor:
Max Ams
by his attorney
A. v. Briesen

UNITED STATES PATENT OFFICE.

MAX AMS, OF NEW YORK, N. Y.

IMPROVEMENT IN METHODS OF PRODUCING FRUIT BUTTER.

Specification forming part of Letters Patent No. 184,027, dated November 7, 1876; application filed September 19, 1876.

*To all whom it may concern:*

Be it known that I, MAX AMS, of New York city, New York, have invented an Improved Method of Producing Fruit Butter, of which the following is a specification:

Figure 1 is a vertical central section of my improved apparatus for producing fruit butter. Fig. 2 is a top view of the same.

Similar letters of reference indicate corresponding parts in all the figures.

The object of this invention is to simplify and cheapen the production of what is termed "fruit butter," being a species of jam or preserves made with or without sugar or other additional ingredients.

My invention consists, principally, in the employment of a hermetically-sealed vessel, combined with steam-pipe, and with a stirring apparatus, in such a manner that the fruit in the vessel will, at the same time, be subjected to the action of the steam and of the stirrer, and thereby rapidly and completely worked into a state of disintegration, the cells of the fruit being also opened by the combined action of steam and stirrer.

In the accompanying drawing, the letter A represents a vessel, of preferably cylindrical form, made of wrought metal or other suitable material, and connected at its opposite ends with two branches of a steam-pipe, B. A shaft, C, enters the vessel A, and carries projecting stirring-arms within said vessel. At one end the vessel is provided with a discharge-orifice, a, which can be closed by a suitable cock, b. The vessel A is hermetically closed, so that no steam will escape from it unless the cock b is opened.

When the fruit has been placed into the vessel, steam is admitted from opposite sides through the branches of the pipe B, and at the same time the stirring apparatus is set in motion, causing a most promiscuous intermingling of the parts, and a thorough breaking up of cells and mashing of the fruit, so that the result desired will be obtained in a short time and with small effort.

I find it desirable to introduce the steam simultaneously from opposite ends, as it will affect the fruit much more thoroughly, and balance the contents of the vessel more perfectly than would be the case if the steam were admitted at one end or side only. The steam introduced in the stirring-vessel serves also to heat the fruit and to thereby prepare it more perfectly for the simultaneous agitating process, rendering it also more perfectly preservative.

I claim—

The method herein described of treating fruit, by placing it in an air-tight vessel, into which steam is conducted, and subjecting it within said vessel at once to mechanical agitation and the action of the incoming steam, thereby mashing the fruit, breaking the cells, and preparing it for use, substantially as specified.

MAX AMS.

Witnesses:
 ERNEST C. WEBB,
 F. V. BRIESEN.